United States Patent
Agrawal et al.

(10) Patent No.: US 10,963,566 B2
(45) Date of Patent: Mar. 30, 2021

(54) MALWARE SEQUENCE DETECTION

(71) Applicant: Microsoft Technology Licensing, LLC, Redmond, WA (US)

(72) Inventors: Rakshit Agrawal, Redmond, WA (US); Jack Wilson Stokes, III, North Bend, WA (US); Karthik Selvaraj, Kirkland, WA (US); Adrian M. Marinescu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 15/879,593

(22) Filed: Jan. 25, 2018

(65) Prior Publication Data

US 2019/0228154 A1 Jul. 25, 2019

(51) Int. Cl.
*G06F 21/56* (2013.01)
*G06N 3/04* (2006.01)
*G06N 3/08* (2006.01)

(52) U.S. Cl.
CPC .......... *G06F 21/566* (2013.01); *G06F 21/56* (2013.01); *G06N 3/0454* (2013.01); *G06N 3/0472* (2013.01); *G06N 3/08* (2013.01)

(58) Field of Classification Search
CPC ..... G06F 21/566; G06F 21/56; G06N 3/0454; G06N 3/0472; G06N 3/08
USPC ......................................................... 726/24
See application file for complete search history.

(56) References Cited

U.S. PATENT DOCUMENTS

| | | | | |
|---|---|---|---|---|
| 8,028,338 B1 * | 9/2011 | Schneider | ............. | G06F 21/564 |
| | | | | 713/188 |
| 8,401,982 B1 * | 3/2013 | Satish | .................... | G06N 20/00 |
| | | | | 706/20 |
| 9,705,904 B1 | 7/2017 | Davis et al. | | |
| 9,942,246 B2 * | 4/2018 | Katz | ................... | H04L 63/1408 |
| 10,305,923 B2 * | 5/2019 | McLane | ................... | G06N 5/04 |
| 10,440,037 B2 * | 10/2019 | Thayer | ................... | G06N 20/00 |

(Continued)

FOREIGN PATENT DOCUMENTS

| WO | 2017193036 A1 | 11/2017 | | |
|---|---|---|---|---|
| WO | WO-2017193036 A1 * | 11/2017 | ........... | G06N 3/0454 |

OTHER PUBLICATIONS 4D spatial perception established through hypercube recognition tasks using interactive visualization system with 3D screen Takanobu Miwa, Yukihito Sakai, Shuji Hashimoto SAP '15: Proceedings of the ACM SIGGRAPG Symposium on Applied Perception. Sep. 2015, pp. 75-82. (Year: 2015).*

(Continued)

*Primary Examiner* — Kambiz Zand
*Assistant Examiner* — Mohammad S Shams
(74) *Attorney, Agent, or Firm* — Holzer Patel Drennan

(57) ABSTRACT

Implementations described herein disclose a malware sequence detection system for detecting presence of malware in a plurality of events. An implementation of the malware sequence detection includes receiving a sequence of a plurality of events, and detecting presence of a sequence of malware commands within the sequence of a plurality of events by dividing the sequence of plurality of events into a plurality of subsequences, performing sequential subsequence learning on one or more of the plurality of subsequences, and generating a probability of one or more of the plurality of subsequences being a malware based on the output of the sequential subsequence.

20 Claims, 10 Drawing Sheets

(56) References Cited

U.S. PATENT DOCUMENTS

| | | | | |
|---|---|---|---|---|
| 2010/0094767 | A1* | 4/2010 | Miltonberger | G06Q 10/10 705/325 |
| 2012/0260342 | A1* | 10/2012 | Dube | G06F 21/564 726/24 |
| 2014/0090061 | A1* | 3/2014 | Avasarala | G06F 21/56 726/24 |
| 2014/0279762 | A1* | 9/2014 | Xaypanya | G06N 3/08 706/12 |
| 2015/0058988 | A1* | 2/2015 | Katz | H04L 63/145 726/23 |
| 2015/0295945 | A1* | 10/2015 | Canzanese, Jr. | G06F 9/45545 726/23 |
| 2017/0083703 | A1 | 3/2017 | Abbasi et al. | |
| 2018/0075349 | A1* | 3/2018 | Zhao | G06N 3/084 |
| 2019/0042745 | A1* | 2/2019 | Chen | G06F 21/552 |
| 2019/0197397 | A1* | 6/2019 | Verma | G06N 3/08 |

OTHER PUBLICATIONS

Evaluating Convolutional Neural Network for Effective Mobile Malware Detection Fabio Martinelli, Fiammetta Marulli, Francesco Mercaldo Procedia Computer Science, vol. 112, 2017, pp. 2372-2381 (Year: 2017).*

Abadi, et al., "TensorFlow: Large-scale machine learning on heterogeneous distributed systems", In Journal of Computing Research Repository, Dec. 3, 2015, pp. 1-19.

Athiwaratkun, et al., "Malware classification with LSTM and GRU language models and a character level CNN", In Proceedings of IEEE International Conference on Acoustics, Speech and Signal Processing, Mar. 5, 2017, 5 Pages.

Attaluri, et al., "Profile hidden markov models and metamorphic virus detection", In Journal in Computer Virology, vol. 5, Issue 2, May 2009, pp. 151-169.

Bahdanau, et al., "Neural Machine Translation by Jointly Learning to Align and Translate", In Computing Research Repository, Sep. 2014, pp. 1-15.

Bengio, et al., "Learning long-term dependencies with gradient descent is difficult", In Journal IEEE Transactions on Neural Networks, vol. 5 Issue 2, Mar. 1994, pp. 157-166.

Bott, Ed, "Defective McAfee update causes worldwide meltdown of xp pcs", Retrieved From <<http://www.zdnet.com/article/defective-mcafee-update-causes-worldwide-meltdown-of-xp-pcs/>>, Apr. 21, 2010, 20 Pages.

Chollet, et al., "Keras", Retrieved From <<https://github.com/keras-team/keras>>, Retrieved on: Dec. 20, 2017, 4 Pages.

Cireşan, et al., "Flexible, high performance convolutional neural networks for image classification", In Proceedings of the Twenty-Second international joint conference on Artificial Intelligence, vol. 2, Jul. 16, 2011, pp. 1237-1242.

David, et al., "DeepSign: Deep Learning for Automatic Malware Signature Generation and Classification", In Proceedings of International Joint Conference on Neural Networks, Jul. 12, 2015, 8 Pages.

Gehring, et al., "A Convolutional Encoder Model for Neural Machine Translation", In Journal of Computing Research Repository, Nov. 2016, pp. 1-13.

Gers, et al., "Learning to Forget: Continual Prediction with LSTM", In Proceedings of Ninth International Conference on Artificial Neural Networks, Sep. 7, 1999, pp. 850-855.

Graves, et al., "Hybrid computing using a neural network with dynamic external memory", In International Journal of Nature, Oct. 12, 2016, 21 Pages.

Graves, et al., "Neural Turing Machines", In Journal of Computing Research Repository, Oct. 2014, pp. 1-26.

Graves, et al., "Speech recognition with deep recurrent neural networks", In Proceedings of IEEE International Conference on Acoustics, Speech and Signal Processing, May 26, 2013, pp. 6645-6649.

Hochreiter, et al., "Long short-term memory", In Journal of Neural Computation, No. 9, Issue 8, Nov. 15, 1997, pp. 1735-1780.

Hochreiter, Sepp, "The vanishing gradient problem during learning recurrent neural nets and problem solutions", In International Journal of Uncertainty, Fuzziness and Knowledge-Based Systems, vol. 6, Issue 2, Apr. 1998, pp. 1-10.

Kolosnjaji, et al., "Deep learning for classification of malware system call sequences", In Proceedings of Australasian Joint Conference on Artificial Intelligence, Dec. 5, 2016, pp. 1-12.

Kolosnjaji, et al., "Empowering convolutional networks for malware classification and analysis", In Proceedings of International Joint Conference on Neural Networks, May 14, 2017, 8 Pages.

Krizhevsky, et al., "Imagenet classification with deep convolutional neural networks", In Proceedings of the 25th International Conference on Neural Information Processing Systems, vol. 1, Dec. 3, 2012, pp. 1-9.

Pascanu, et al., "Malware classification with recurrent networks", In Proceedings of IEEE International Conference on Acoustics, Speech and Signal Processing, Apr. 19, 2015, 5 Pages.

Pfoh, et al., "Leveraging String Kernels for Malware Detection", In Proceedings of International Conference on Network and System Security, Jun. 3, 2013, pp. 1-14.

Vinyals, et al., "Pointer Networks", In Proceedings of Advances in Neural Information Processing Systems, 2015, pp. 1-9.

Weston, et al., "Memory Networks", Retrieved From <<https://arxiv.org/pdf/1410.3916>>, Oct. 15, 2014, pp. 1-15.

Xu, et al., "Show, Attend and Tell: Neural Image Caption Generation with Visual Attention", In Proceedings of the 32nd International Conference on Machine Learning, Jul. 6, 2015, 10 Pages.

Gehring, et al., "Convolutional Sequence to Sequence Learning", In Proceedings of the 34th International Conference on Machine Learning, Aug. 6, 2017, 15 Pages.

LeCun, et al., "Convolutional networks for images speech and time series", In Publication of the handbook of brain theory and neural networks, vol. 3361, Issue 10, 1995, pp. 1-14.

Mikolov, et al., "Recurrent neural network based language model", In Journal of Interspeech, vol. 2, Sep. 26, 2010, pp. 1045-1048.

Rossum, Guido Van, "Python reference manual", In Technical Report CWI Report CS-R9525 of Centre for Mathematics and Computer Science, May 1995, 59 Pages.

Russakovsky, et al., "Imagenet large scale visual recognition challenge", In International Journal of Computer Vision, vol. 115, Issue 3, Dec. 2015, pp. 1-43.

Scherer, et al., "Evaluation of pooling operations in convolutional architectures for object recognition", In Proceedings of the 20th international conference on Artificial neural networks, Sep. 15, 2010, 10 Pages.

Sundermeyer, et al., "LSTM neural networks for language modeling", In Proceedings of 13th Annual Conference of the International Speech Communication Association, Sep. 9, 2012, 4 Pages.

Graves, et al., "Hybrid speech recognition with Deep Bidirectional LSTM", In Proceedings of IEEE Workshop on Automatic Speech Recognition and Understand, Dec. 2013, pp. 273-278.

Tobiyama, et al., "Malware detection with deep neural network using process behavior", In Proceedings of IEEE 40th Annual Computer Software and Applications Conference, Jun. 10, 2016, pp. 577-582.

"International Search Report and Written Opinion Issued in PCT Application No. PCT/US2018/068098", dated Apr. 11, 2019, 11 Pages.

* cited by examiner

MALWARE SEQUENCE DETECTION

BACKGROUND

The reach and scale of the Internet has fostered a parasitic industry of those who seek to illegally and/or unethically profit. A common strategy to profit illegally is to infect computers of users with malicious code or software (malware) that can be employed to obtain passwords, transmit spam, retrieve contact lists, participate in a botnet, etc. Malware is a persistent and continuously growing problem in computer security. Malware usually exploits code vulnerabilities and/or gets installed onto users' computer systems by tricking users into taking some action. Malware, as an act of enabling a piece of software to run sequences of operations with a negative intent, can cause severe production level issues. Furthermore, the sequence of events of the malware may be non-continuous, within the entire sequence of operations, and therefore not easy to detect. Similarly, the sequence of events of the malware may be effectuated by multiple processes running independent of each other.

SUMMARY

Implementations described herein disclose a malware sequence detection system for detecting the presence of malware in a plurality of events. An implementation of the malware sequence detection includes receiving a sequence of a plurality of events, and detecting presence of a sequence of malware commands within the sequence of a plurality of events by dividing the sequence of plurality of events into a plurality of subsequences, performing sequential subsequence learning on one or more of the plurality of subsequences, and generating a probability of one or more of the plurality of subsequences being a malware based on the output of the sequential subsequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Figure 1:
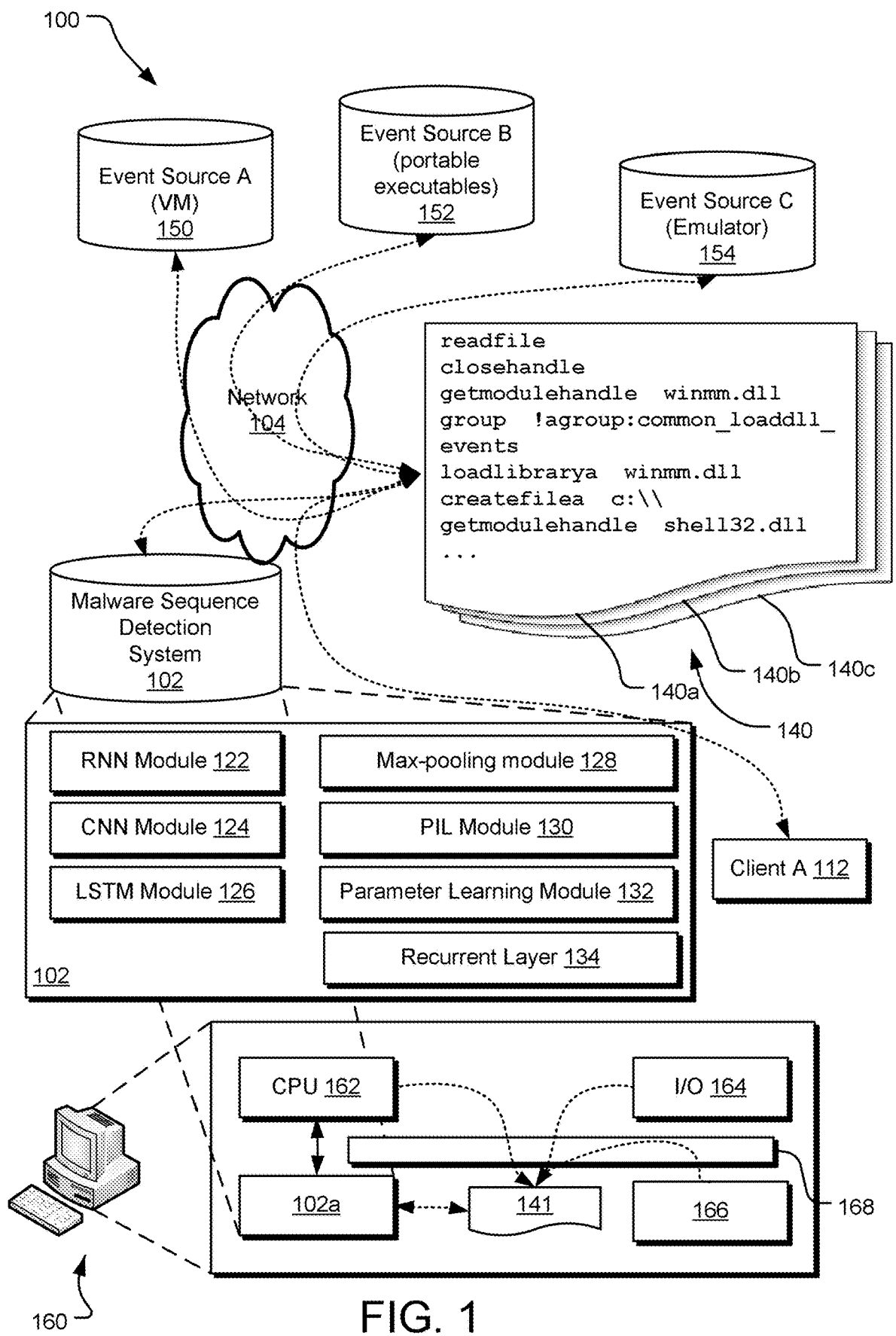
FIG. 1 illustrates an example implementation of a system for providing malware sequence detection.

Malicious software, or malware, is a persistent and continuously growing problem in computer security. Malware, as an act of enabling a piece of software to run sequences of operations with a negative intent, can causes severe production level issues. As used herein, the term "malware" includes malicious files, processes, programs, instructions, data, and/or software that are intended to damage, disrupt, or disable computers and computer systems or cause harm to computer users or the computer user's data. By embedding certain snippets of code within a regular software, it can successfully run desired commands without being detected by anti-virus software. However, due to the fact that certain commands have to be run in some order related to the functionality of the malware or in combination with some other sequence of malware instructions for the malware to take effect, defense is possible if the software can be executed in a secure environment and malicious actions can be detected during this emulation. However, the task of detecting the presence of malware within the emulation, may be difficult. Similarly, detecting presence of malware in a computing environment, such as a laptop, a desktop, a mobile device, etc., where event sequences generated by various components such as a processor, an I/O device, etc., are being evaluated for presence of malware may also be difficult. With continuously increasing numbers and subtle variations observed in malware, simply trying sets of rules for detection can run obsolete very quickly. But an underlying fact for any variant is its dependence on the sequence of commands it needs to operate. While those commands can be spread out within the execution, they cannot be eliminated or invariably reordered. Nature of their sequential occurrence is still important for these variants to operate.

The technology described herein discloses a system for detecting the existence of malware by detecting a sequence of malware related events. The malware sequence detection system disclosed herein may be implemented on a native operating system running on a computing system, on a virtual machine, on a cloud computing system, on an emulation of a system, etc. In some instances, the malware may originate from a file which is downloaded from the Internet, attached to an email, or stored on a portable thumb drive or hard drive. In other instances, the malware may be a series of execution codes which is injected into a running process. In other instances, the malware may be a set of benign return-oriented programming (ROP) instructions or commands, which are executed in such a way to perform malicious activity. In one implementation of the malware sequence detection system disclosed, the sequence of events analyzed by the malware sequence detection system may be a sequence of instructions in a malware file. Alternatively, the sequence of events may be a sequence of calls made to an operating system by multiple processes. For example, the total corpus of sequence of commands or calls made by multiple different processes with different functionalities may be analyzed by the malware sequence detection system disclosed herein to determine the existence of malware. Thus, for example, the individual events analyzed by the malware sequence detection system disclosed herein may include process creation events, networking events, registry activation events, etc.

In an implementation, the malware sequence detection system disclosed herein includes a number of computer executable instructions that can operate directly on file event sequences or process event sequences in order to learn a probability of the file being malicious in nature. Specifically, the malware sequence detection system detects a sequence of events, co-occurrence of one or more of these events, and its order to determine if they are part of a malware file or process. In part, the malware sequence detection system can be used to halt the execution of a malicious file or process thereby preventing additional harm to the infected computer system.

FIG. 1 illustrates an example implementation 100 including a malware sequence detection system 102 for providing detection of a sequence of malware events. Specifically, the malware sequence detection system 102 may provide malware sequence detection by analyzing event data generated by one or more event sources, such as an event source A 150 that may be a virtual machine (VM), an event source B 152 that may include a plurality of executable files running on a native operating system, an event source C 154 that may be an emulator which tries to coax the malware into performing the malicious behavior without running it on a full operating system, etc. Each of the event sources 150, 152, 154 may communicate with the malware sequence detection system 102 via a network such as the Internet. In some implementations, the malware sequence detection system may be configured to communicate with one or more of the event sources 150, 152, 154 about the results of its analysis of the event data 140. Data collected previously from the event sources 150, 152, 154 may be used to train the malware sequence detection system 102.

In the illustrated implementation, the malware sequence detection system 102 is implemented in a cloud environment where various components of the malware sequence detection system 102 may be implemented on one server or in a distributed manner on several servers. Alternatively, the malware sequence detection system 102 may be implemented on a computing device, such as a computing device 160, as further discussed below. The malware sequence detection system 102 may be communicatively connected to the event sources 150, 152, 154 via the network 104. Furthermore, the malware sequence detection system 102 may also be communicatively connected to various clients, such as a client (client A) 112. For example, the malware sequence detection system 102 may be connected to the client 112 via the network 104 or via a private network such as a virtual private network (VPN) (not shown). The client 112 may be a standalone client computing device that is affected by one or more operations of the event source 150, 152, 154, etc. For example, the client 112 may be a device that makes one or more API calls to the operating system with executable files at event source B 152. In alternative implementations, the client 112 may run one or more JavaScript commands, Visual Basic Script commands, etc., on the client 112 and one or more of these commands may be the source of the event data 140. Furthermore, the event data 140 may also include parameters associated with the events therein and the processing of the parameters is further discussed below in FIGS. 3 and 9. The malware sequence detection system 102 notifies the client 112 upon detecting the presence of any malware based on its analysis of the event data 140. Alternatively, the malware sequence detection system 102 may also notify one or more of the event sources 150, 152, 154 about the potential presence of any malware based on its analysis of the event data 140.

Alternatively, a malware sequence detection system 102a may be implemented on a computing device 160. For example, the computing device 160 may be a laptop, a desktop (as shown herein), a mobile device, etc. The malware sequence detection system 102a may include the various components 122-134 as disclosed herein (122, 124, 126, 128, 130, 132, 134) with respect to the malware sequence detection system 102. The computing device 160 may include among other components, a CPU 162, an input/output module 164, a memory 166, and an internal communication bus 168. Each of the various components 162, 164, 166 may generate malware event sequences 141 such as malware file event sequences or malware process event sequences. Such event sequences 141 may be communicated to the malware sequence detection system 102a via the communication bus 168 and may be stored on the memory 166. For example, the I/O module 164 may receive malware event sequences from an external source such as a website via the network 104. The functionalities of the malware sequence detection system 102a may be substantially similar to the functionalities of the malware sequence detection system 102 as discussed herein. Furthermore, the computing device 160 may also be communicatively connected with the malware sequence detection system 102 via the network 104. The parameters of the malware sequence detection system 102a may be trained using the malware sequence detection system 102.

The event data 140 may be in the form of a sequential data structure, including a large number of event sequences such as event sequences 140a, 140b, 140c. Each of the event sequences 140a, 140b, 140c may be of a complex nature by itself. Each event in the event sequences 140a, 140b, 140c may be in the form of a word. Thus, for example, the event sequence 140a includes events "readfile," "closehandle," "getmodulehandle," etc. In one implementation of the system 100, the words or events are represented by identification (ID) numbers within a predetermined range that may be processed by the malware sequence detection system 102. For example, the event "readfile" may be represented by an identification number 37, an event "closehandle" may be represented by an identification number 67, etc. While the event sequence 140a is illustrated by a small number of events, in practice such event sequences may be substantially long and therefore it may be difficult to identify events that may form part of the malware. Furthermore, it is possible that a malware creator hides one or more of the commands or events of the malware towards the later part of such long event sequences such that a malware detection machine may not capture such events or commands from the later part of the event sequence.

Neural networks are capable of learning hidden relations from such complex data structures and may be used to process the event data 140 to identify words or events that may form part of malicious behavior. In the illustrated implementation, the malware sequence detection system 102 includes various modules to analyze the event data 140 to determine the co-occurrence of events and specifically determine the sequential nature of co-occurring events. Furthermore, the malware sequence detection system 102 is capable of analyzing very long event sequences, such as an event sequence with more than 64K disparate events, to ensure that malware events or instructions are not hidden in the later part of long event sequences. In one implementation, the malware sequence detection system 102 determines whether there may be additional malware events in event sequences based on analysis of the event sequence that the malware sequence detection system 102 has access to. Alternatively, such determination may also be made using various heuristics, such as whether an event asking for user input has occurred, denoting the potential end of the malware event sequence, etc.

An implementation of the malware sequence detection system 102 uses a recurrent layer 134 that is configured to find occurrences of relevant events among the event data 140. The recurrent layer 134 may allow analyzing long event sequences. An implementation of the malware sequence detection system 102 uses long-short term memory (LSTM) units for the recurrent layer 134. Alternatively, the malware sequence detection system 102 may use gated recurrent units (GRUB) (not shown) or recurrent neural network (RNN) units 122 for the recurrent layer 134. The functioning of the LSTM units is discussed in further detail below.

The malware sequence detection system 102 may also use a convolutional neural network (CNN) module 124. The CNN module 124 allows finding malicious events in small blocks of event sequences 140a, 140b, 140c. The output of the CNN module 124 may be input to a long-short term memory (LSTM) module 126. Specifically, the LSTM module 126 may be a memory-based variant of the recurrent layer 134 where each neuron is defined as a gated cell with memory. The LSTM module 126 operates by maintaining both a hidden state and a memory at each time step. In one implementation, the LSTM network module may be implemented by the following equations for each cell:

$$i_t = \sigma(W_{hi}h_{t-1} + W_{xi}x_t + b_i)$$

$$f_t = \sigma(W_{hf}h_{t-1} + W_{xf}x_t + b_f)$$

$$o_t = \sigma(W_{ho}h_{t-1} + W_{xo}x_t + b_o)$$

$$c_t = \text{odot}(f_t, c_{t-1}) + \text{odot}(i_t, \tanh(W_{hc}h_{t-1} + W_{xc}x_t + b_c))$$

$$h_t = \text{odot}(o_t, \tanh(c_t))$$

Where $\sigma$ is the logistic sigmoid function, $i_t$; $f_t$; $o_t$; $c_t$ are input gate, forget gate, output gate and cell activation respectively. $W_h$ are the recurrent weight matrices for each gate and W are the input weight matrices. The terms b are bias terms. Odot( ) is the "odot" function which multiplies each element in the two input matrices together, in isolation, to form the result matrix. At each time step t, the network updates both cell memory $c_t$ and provides a hidden state $h_t$.

The malware sequence detection system 102 may also use a max-pooling module 128. The operations of the max-pooling module 128 are further disclosed in FIG. 5 below. Functioning of a pre-informant learning (PIL) module 130 used by the malware sequence detection system 102 is disclosed in further detail in FIG. 8 below. The PIL module 130 allows the malware sequence detection system 102 to determine the presence of malware at early stages and terminate further processing. A parameter learning module 132 used by the malware sequence detection system 102 is further illustrated in FIG. 9. The parameter learning module 132 allows using additional information collected from event parameters to determine the presence of malware in event sequences.

Figure 2:
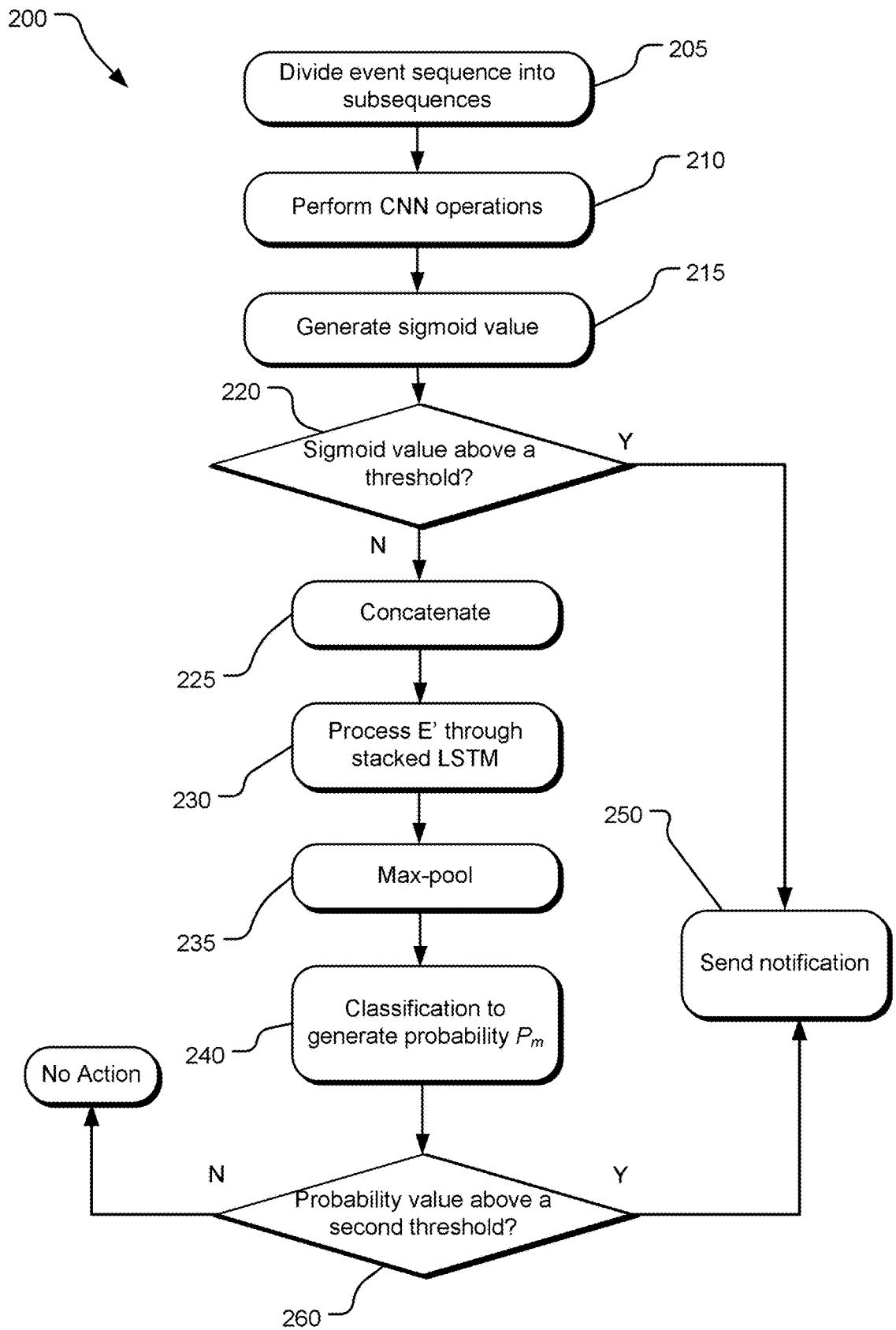
FIG. 2 illustrates example operations for providing malware sequence detection disclosed herein.

FIG. 2 illustrates operations 200 for providing malware sequence detection disclosed herein. Specifically, the operations 200 provide pre-informant learning (PIL) based on the analysis of the event sequences such that the process of analyzing subsequences may be terminated early based on information generated by a PIL module. An operation 205 receives an event sequence, such as the event sequence 140 illustrated in FIG. 1, and divides the event sequence into a number of subsequences. In one implementation, the subsequences may be overlapping. However, non-overlapping subsequences may also be used.

An operation 210 performs convolutions using a CNN module, such as the CNN module 124 disclosed in FIG. 1. The output of the CNN operations is input to a PIL module where a sigmoid operation 215 generates a sigmoid value. A comparing operation 220 compares the sigmoid value to a threshold. If the sigmoid value is above a threshold, it may be determined that the event sequence includes malware and an operation 250 may send a notification to a receiver, such as a client device, an emulator, etc. One possible action in response to the notification may be to terminate further processing of the subsequences. If the sigmoid value is below the threshold, the value of the sigmoid is concatenated to the subsequence at an operation 225. The concatenated subsequences are recombined to form an output vector (E').

The output vector (E') may be processed through a stacked LSTM module at an operation 230. The output of the stacked LSTM operation is further processed through a max-pooling module at operation 235. An example of a max-pooling operation is further disclosed in FIG. 5. The max-pooled layer output is classified at an operation 240 to generate a probability of the event sequence including malware. In one implementation, the classifying of the max-pooled layer output may use a machine learning classifier such as a neural network, deep neural network, decision tree, boosted decision tree, support vector machine, naïve bayes, or logistic regression. Subsequently, a determining operation 260 compares the probability value $P_m$ generated by the classification block with a second threshold to determine whether the event sequence, such as the event sequence 140 disclosed in FIG. 1 includes any malware. If the presence of malware in the event sequence is determined, the operation 250 may send a notification to receiver, such as a client device, an emulator, etc., about the presence of malware so that such receiver may take appropriate action as necessary. One possible action from the notification is to terminate processing further subsequences.

Figure 3:
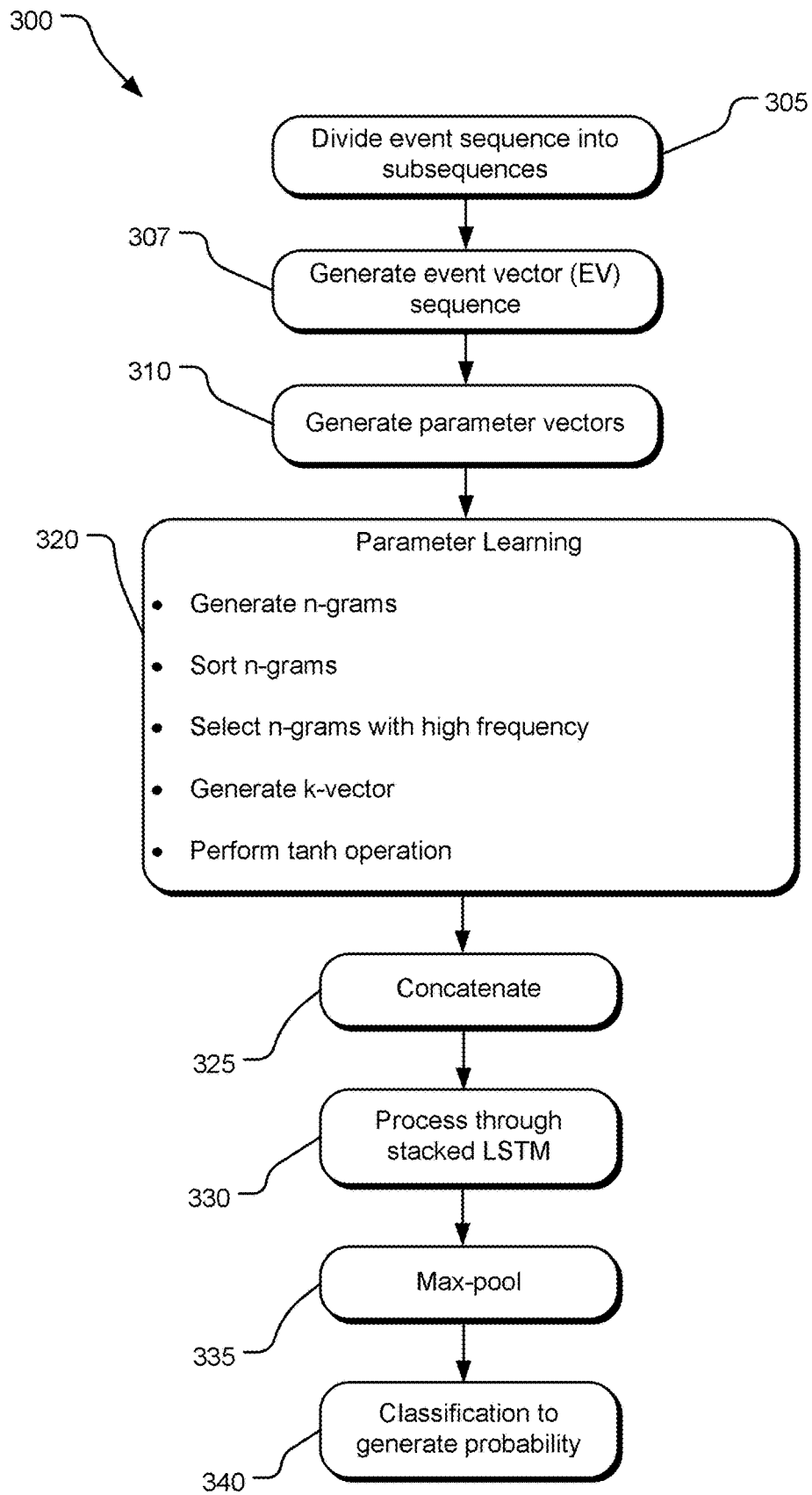
FIG. 3 illustrates alternative example operations for providing malware sequence detection disclosed herein.

FIG. 3 illustrates alternative operations 300 for providing malware sequence detection. Specifically, the operations 300 provide parameter learning using various parameters associates with one or more of the events present in the event sequence. An operation 305 receives an event sequence, such as the event sequence 140 illustrated in FIG. 1, and divides the event sequence into a number of subsequences. For each subsequence, the events of the subsequence may be identified by identification numbers. For example, an event "readfile" is represented by an identification number 37, an event "closehandle" is represented by an identification number 67, etc. In one implementation, the subsequences may be overlapping. However, non-overlapping subsequences may also be used.

An operation 307 generates an event vector (EV) sequence for the events of the given subsequence. For example, the operation 307 may be implemented by an embedding layer, such as an embedding layer 404 discussed below in FIG. 4. An operation 310 generates one or more parameter vectors using the parameters associated with the events. A parameter learning operation 320 extracts and adds additional information from the parameters associated with the events. In one implementation, the parameter learning operation 320 may include generating n-grams (e.g., a bigram, a trigram, etc.) from the parameters, sorts the n-grams and selects a predetermined number of n-grams having higher frequencies. The selected n-grams may be used to generate a k-vector representing the presence ("1") or absence ("0") of the n-gram with an event and a tanh, a sigmoid, or a rectified linear unit (ReLU) operation may generate an output value of the k-vector. In an alternative implementation, a sparse vector may be used to represent the k-vector, which only has the indices of the n-gram that are set to "1" if the parameter includes the n-gram while no indices are used where the values which are set to "0." In another alternative implementation, a sparse vector may be used to represent the k-vector, which has the indices of the n-grams that are included in the parameter and the counts of the number of times each n-gram that is included in the parameter while no indices or counts are used where the values are set to "0." The operations of the parameter learning operation 320 are also further illustrated below in FIG. 9.

An operation 325 concatenates the output of the parameter learning operation for each parameter to the event subsequences. The concatenated subsequences may be processed through a recurrent layer at an operation 330. In one implementation, the recurrent layer may be a stacked LSTM model with two or more stacked LSTM layers. An example of such stacked LSTM model is further illustrated by the recurrent layer 410 disclosed in FIG. 4. The output of the stacked LSTM operation 330 is further processed through a max-pooling module at operation 335. An example of a max-pooling operation is further disclosed in FIG. 5. The max-pooled layer output is classified at an operation 340 to generate a probability of the event sequence including malware.

Figure 4:
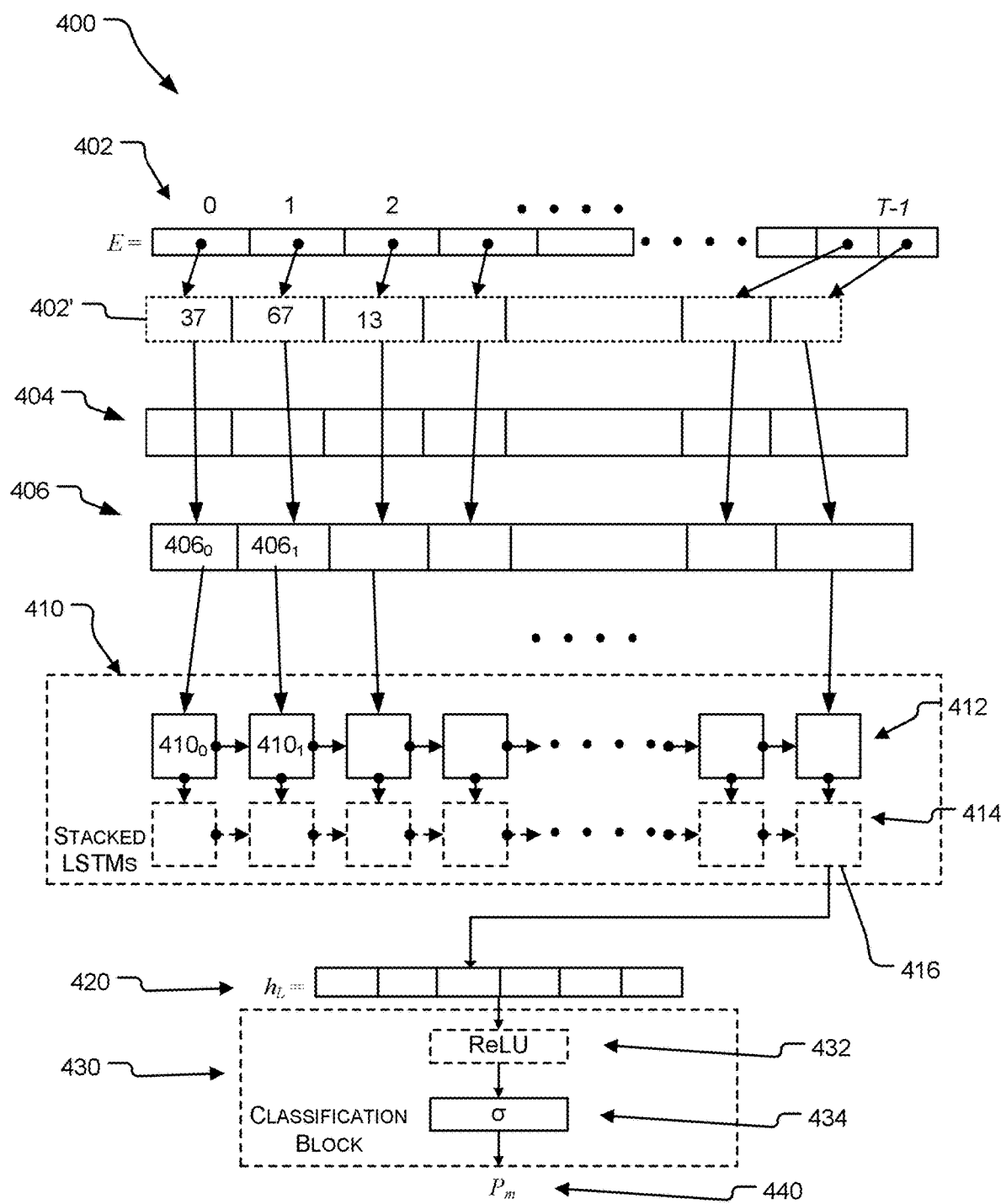
FIG. 4 illustrates an example implementation of a long-short term memory (LSTM) model used with the malware sequence detection system disclosed herein.

FIG. 4 illustrates an implementation of a malware sequence detection system 400 using a recurrent layer 410 for generating the probability of an event sequence being malware. The recurrent layer 410 may have a number of cells for recurrent layers that may be used with long event sequences. E: [E(0)-E(T−1)] 402 is a list of events with t being the time-stamp. In one implementation, the recurrent layer 410 takes multiple events of a sequence as its input. For example, the recurrent layer 410 may take T events of the sequence. Each event in the event sequence E may be represented by a number (such as 37, 67, 13, . . . ) as shown by 402'. An embedding layer 404 converts the event sequence E into an event vector (EV) sequence 406 where each cell of the EV sequence 406 is represented by an event vector for each event E(t). The parameters of the embedding layer 404 can be learned using machine learning methods. In an alternate implementation, the embedding layer 404 can be set using methods such as Word2Vec or Glove. In another implementation, the embedding layer 404 can be set using a method such as one-hot encoding. In one-hot encoding, for example, an event E(0) may be represented by setting bit 37 of an event vector $406_0$ to "1" and all other bits of the event vector $406_0$ to "0", an event E(1) may be represented by setting bit 67 of an event vector $406_1$ to "1" and all other bits of the event vector $406_1$ to "0", etc.

The vectors of the event vector sequence 406 is input to the recurrent layer 410. In one implementation, the recurrent layer 410 may act as a language model. Specifically, the recurrent layer 410 may include a plurality of neuron cells $410_0$, $410_1$, etc. The recurrent layer 410 performs recurrent learning on the event sequence E 402. The event vector 406 is used to update each of the plurality of neuron cells $410_0$, $410_1$. Each plurality of neuron cells $410_0$, $410_1$, . . . may represent the state of the LSTM's internal vectors before processing event E(t). Furthermore, the output of the cells as they are updated with the previous update of the event vector 406 is also input to the subsequent neuron cells. Thus, each of the plurality of neuron cells $410_0$, $410_1$ updates its state based on updated event vector 406 as new events are added to the event sequence 402. In alternate implementations, the recurrent layer 410 may include a recurrent neural network (RNN), a stacked RNN, a gated recurrent unit (GRU), or a stacked GRU.

The result of the processing output of the last event 416 is $h_L$ 420, which is in the form of a vector and the length of the vector may be selected based on one or more constraints on the recurrent layer 410, such as the available memory, time, etc. The output for the last of the plurality of neuron cells $410_{T-1}$ represented by $h_L$ 420 may represent the hidden state of the recurrent layer 410 at the last time step obtained after processing E(T−1). In an alternate implementation, $h_L$ 420 may represent the output of the last event 416 which is a prediction of the next event following the sequence of events E(T−1). This output $h_L$ 420 of the recurrent layer 410 is input to a classification block 430. The classification block 430 may be a neural network or a deep neural network (multi-layer perceptron (MLP)) which includes one or more hidden layers 432 and an output layer 434. The activation function of the one or more hidden layers 432 used in the classification block 430 may be a rectified linear unit (ReLU) function, a sigmoid function or a hyperbolic tangent (tanh) function. The output layer 434 may depend on the output of the one or more hidden layers 432. If the output of the output layer 434 is a binary output such as presence or absence of malware, the output layer 434 may be a sigmoid function. In this case, the output probability $P_m$ 440 has one or two output probabilities. If the output of the classification block 430 includes the probability of multiple classes, such as (a) malware, (b) possibly unwanted software, (c) of malware families, and (d) clean, a SoftMax function may be used for the output layer 434. In this case, the output probability $P_m$ 440 may have more than two output probabilities. In an alternative implementation, the classification block 430 may include another type of machine learning classifier, such as a logistic regression classifier, a decision tree, a boosted decision tree, a naïve bayes classifier, etc.

In an implementation of the malware detection system disclosed herein, the LSTM layers of the recurrent layer 410 are stacked. This is illustrated by the stacked LSTM layers 412 and 414. While in the present implementation the recurrent layer 410 includes a stack of two LSTM layers, in an alternative implementation, a larger number of LSTM layers may be implemented.

Figure 5:
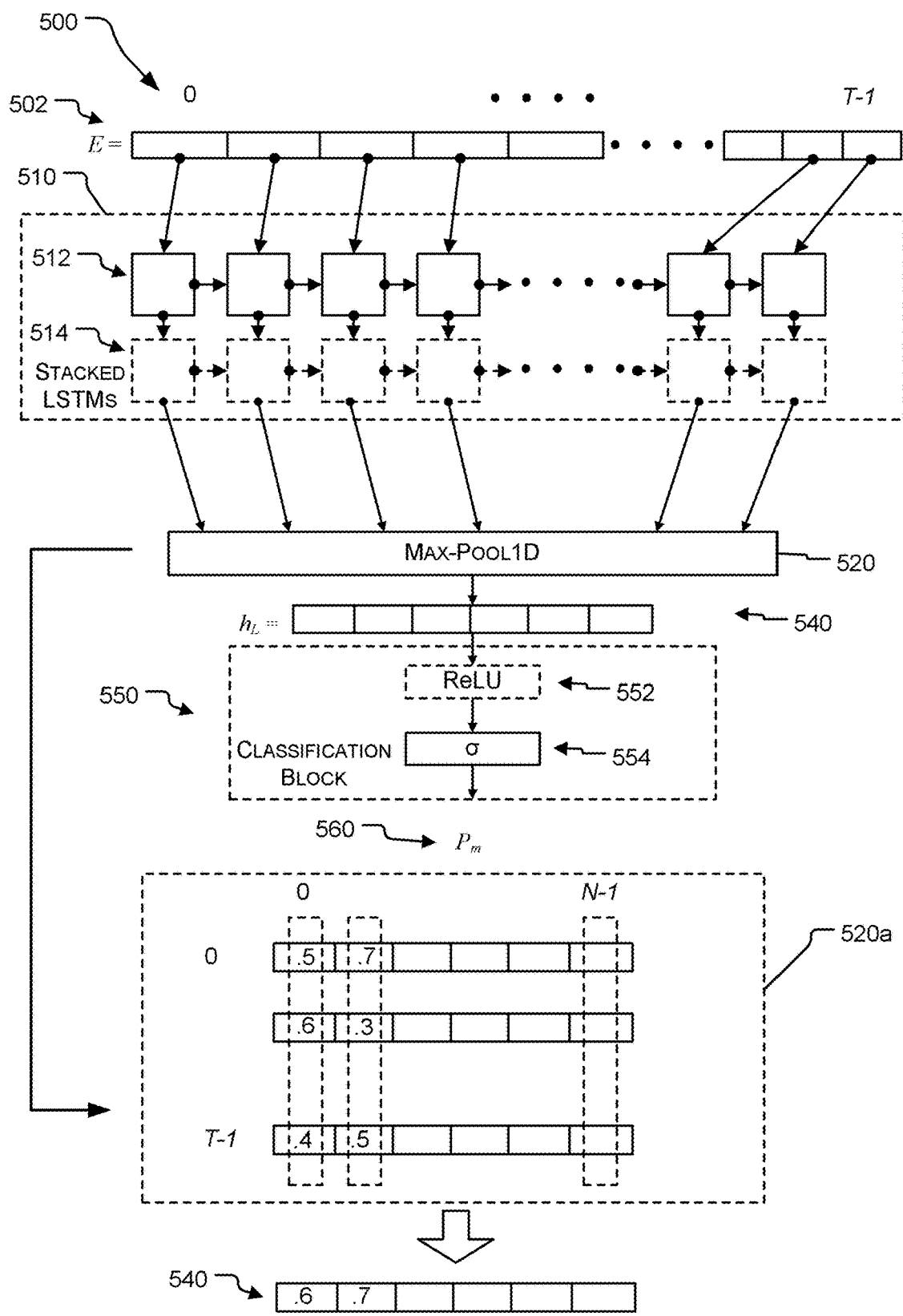
FIG. 5 illustrates an example implementation of a max-pooled layer learning model used with the malware sequence detection system disclosed herein.

FIG. 5 illustrates an example implementation of a max-pooled layer model used with a malware sequence detection system 500. The MPL model is different from the recurrent layer 410 discussed above in FIG. 4. The implementation using the MPL model is different from the recurrent layer 410 discussed above in FIG. 4. in that a max-pooled layer is used in between a recurrent layer, such as an LSTM layer, an RNN layer, etc., and a classification block (such as the classification block 430 discussed in FIG. 4). While in the given implementation, the output 540 of the max-pooled layer 520 is processed through a classification block 550, in alternative implementation, a final prediction generated by a recurrent layer, such as the output 420 of FIG. 4, may be concatenated with the output 540 of the max-pooled layer 520, together with a bag of words of events. Specifically, the bag of words maybe generated by setting an entry in a sparse binary vector for each event if that event has occurred at least once is a given event sequence E.

Specifically, event sequence E 502 is a list of T events with t being the time-step. In one implementation, the event sequence E 502 is input into a stacked LSTM model 510. In one implementation, the event sequence E 502 may be first converted to an event vector, not shown, by an embedding layer, not shown. For example, the stacked LSTM model 510 includes two layers 512 (lower LSTM layer) and 514 (top LSTM layer) of LSTM neurons. However, in an alternative implementation, an alternative number of stacked LSTM layers may also be used. The output of the top LSTM layer 514 is input into a max-pooled layer 520 (the functioning of the max-pooled layer is further disclosed by an expanded block 520a), which generates a max-pooled output n-vector 540. Specifically, the max-pooled layer 520 may have T vectors as its input, with each of the T vectors being an activation generated by the top LSTM layer 514. Thus, for example, each activation output may be in the form of a vector of length N. The max-pooled layer 520 outputs the max-pooled output n-vector 540 where each value of the n-vector represents a maximum value from each of the T values from the N activation vectors. The output of the stacked LSTM model 510 is illustrated in further detail with T (0-T−1) vectors, each vector being of a length N (0-N−1). Thus, for example, the first value of the max-pooled output n-vector 540 of the max-pooled layer 520, the max (0.5, 0.6, . . . , 0.4), is 0.6, the second value of the max-pooled output n-vector 540 of the max-pooled layer 520, the max (0.7, 0.3, . . . , 0.5), is 0.7, etc.

This max-pooled output n-vector 540 is input to a classification block 550 which may include a machine learning classifier, such as a neural network, deep neural network, a logistic regression classifier, a decision tree, a boosted decision tree, a naïve bayes classifier, etc. A neural network or deep neural network may include one or more hidden layers each having a rectified linear unit (ReLU) activation layer 552 and an output layer 554 for the final output. The output of the ReLU activation layer 552 is another vector with values between −1 and 1. The output layer 554 generates a probability value $P_m$ 560 between 0 and 1, which may be the probability of the event sequence E(t) 502 being malware. Using the max-pooled layer 520 allows extracting information from each event of the event sequence E(t) 502 in generating the probability of the event sequence E(t) 502 being malware.

Figure 6:
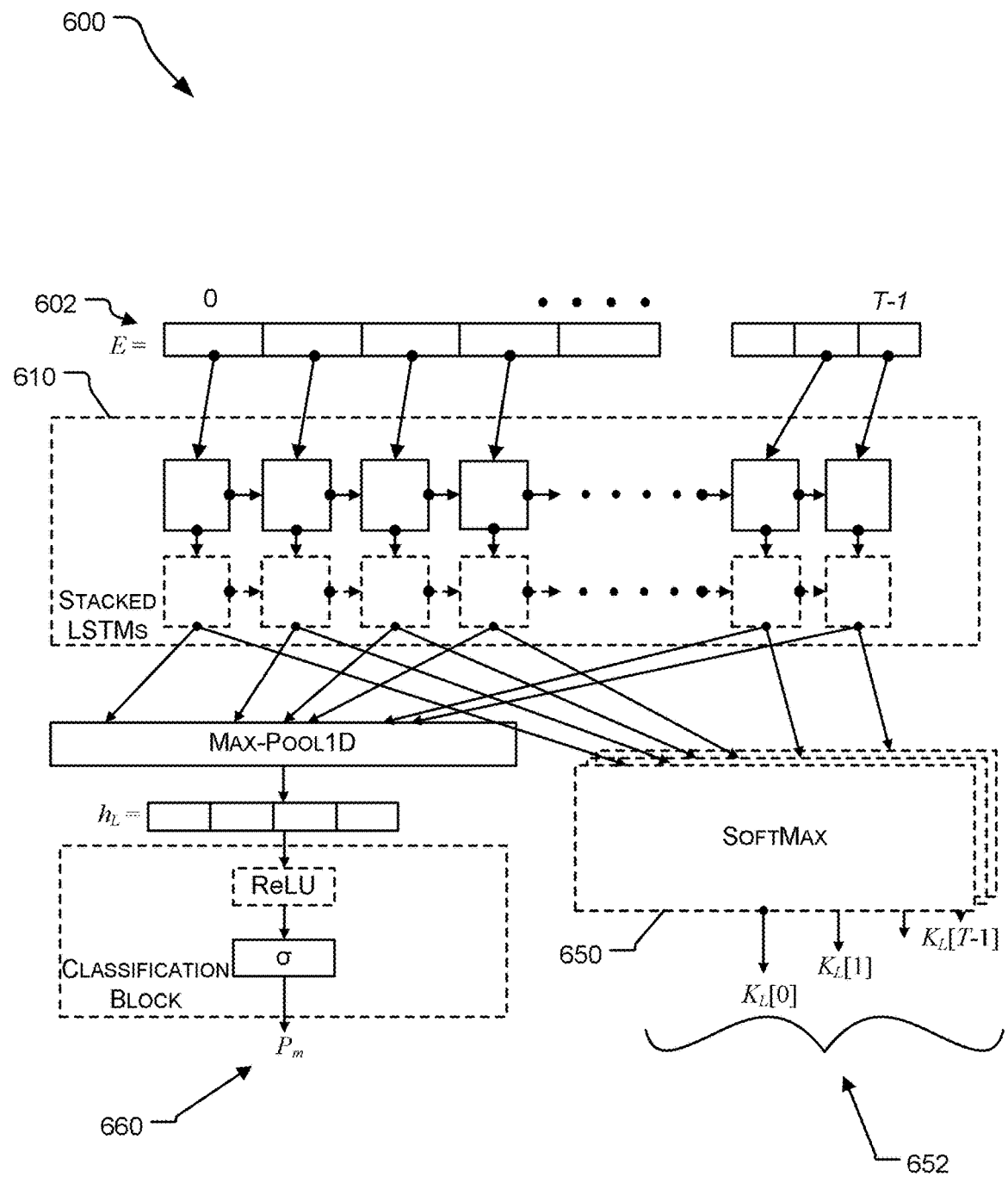
FIG. 6 illustrates an example implementation of a modified language model used with the malware sequence detection system disclosed herein.

FIG. 6 illustrates a modification of the malware sequence detection system 600 disclosed herein in that in addition to generating probability $P_m$ 660 of an event sequence E 602 being malware, it also generates a prediction of the next event following the event sequence E 602. Specifically, the output of a stacked LSTM model 610 is input to a softmax model 650 and the output vector $K_L$ 652 of the softmax model 650 is the probability that the event sequence E 602 belongs to each of the classes $K_L[t]$.

Figure 7:
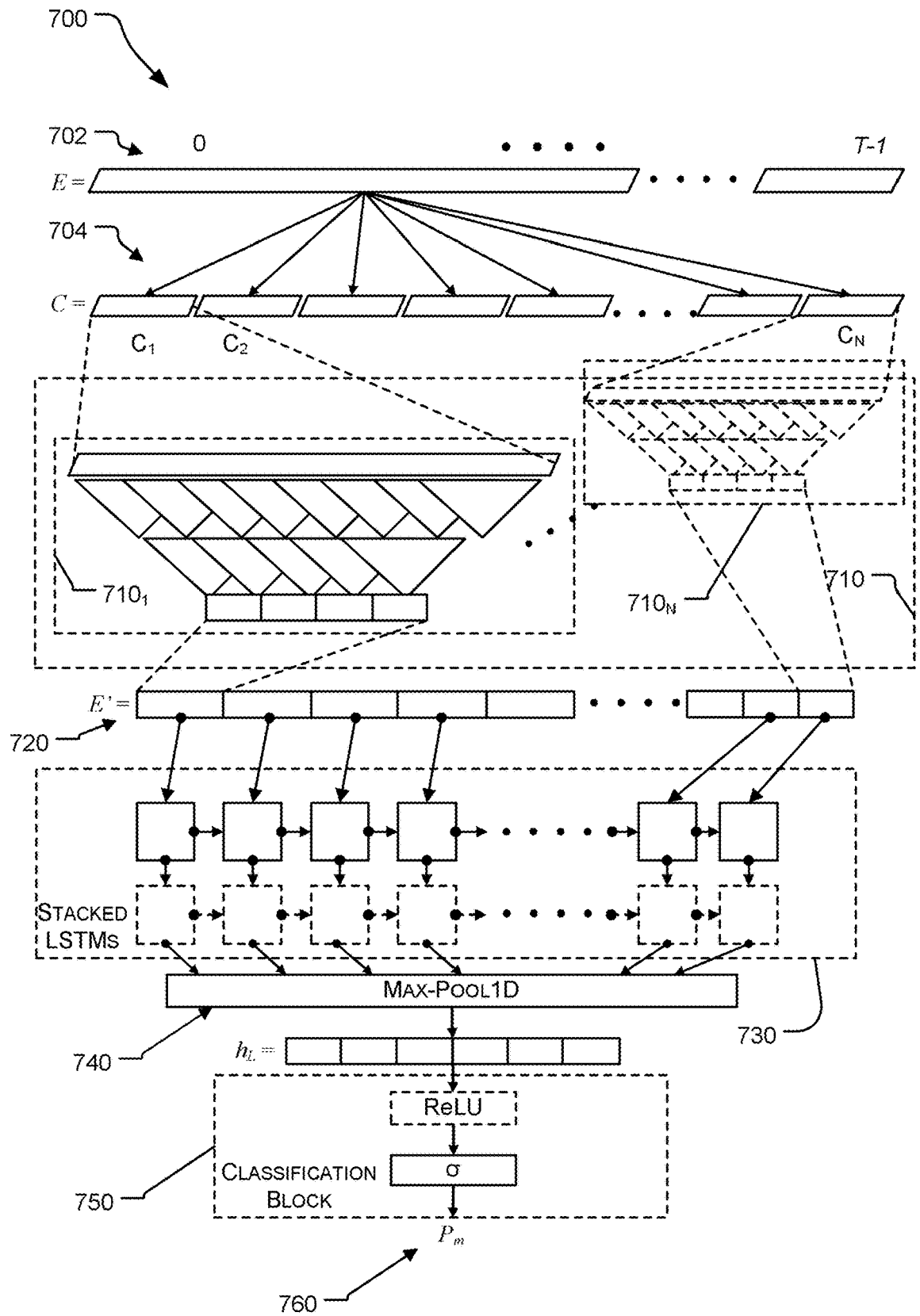
FIG. 7 illustrates an alternative implementation of the malware sequence detection system disclosed herein using sequential subsequence learning.

FIG. 7 illustrates an alternative implementation 700 of the malware sequence detection system disclosed herein. Specifically, a long event sequence E(t) 702 is divided into a number of smaller subsequence of sequences C 704. Each of the subsequences $C_1, C_2, \ldots, C_N$ may include M events, with M being substantially smaller than T. In one implementation, the event sequence E(t) 702 may include a long sequence of events that are received over time, however, these events may be processed through the malware sequence detection system in response to either an instruction from an external source, in response to receiving a specific event, etc. For example, the event sequence E(t) 702 may be an accumulation of events over time and in response to receiving a receiving an instruction notifying a potential threat of malware attack, the malware sequence detection system may initiate the processing of the event sequence E(t) 702.

In one implementation, each of the subsequences $C_1, C_2, \ldots, C_N$ are of the same length M. Furthermore, in some implementations, the subsequences $C_1, C_2, \ldots, C_N$ may be generated to include a distinct set of events. Thus, if the event sequence E(t) 702 has 1000 events, the first subsequence $C_1$ may include the first ten events 0-9, the second subsequence $C_2$ may include the second ten events 10-19, etc. Alternatively, the subsequences $C_1, C_2, \ldots, C_N$ may be overlapping in that the first subsequence $C_1$ may include the first ten events 0-9, the second subsequence $C_2$ may include the ten events 1-10, the third subsequence $C_3$ may include the ten events 2-11, etc.

The subsequences $C_1, C_2, \ldots, C_N$ are input to a convolution neural network (CNN) model 710. The CNN model 710 performs sequential subsequence learning on the subsequences 704. Specifically, the CNN model 710 performs the convolutional learning on each of the subsequences $C_1, C_2, \ldots, C_N$ by performing CNN operation on each of the subsequences $C_1, C_2, \ldots, C_N$. Thus, a CNN operation $710_1$ is performed on the first subsequence $C_1$, while another CNN operation $710_N$ is performed on the last subsequence $C_N$. Each $CNN_i$ operation 710, generates an output value $E_i$ and the series of such output values from the CNN operations $710_1, \ldots, 710_N$ is represented by an event sequence E' 720.

Subsequently, the event sequence E' 720 is input to a recurrent layer 730 including a plurality of stacked LSTM layers, the output of which is input to a max-pooled layer 740. A classification block 750 uses the output of the max-pooled layer 740 to generate a probability $P_m$ 760 of the event sequence E(t) 702 being malware. In one implementation, the classification of the max-pooled output by the classification block 750 may use a machine learning classifier such as a neural network, deep neural network, decision tree, boosted decision tree, support vector machine, naïve bayes, or logistic regression.

Dividing the event sequence E:[E(0)-E(T−1)] 702 into a series of subsequences $C_1, C_2, \ldots, C_N$ and performing CNN operations on each of the subsequences allows training smaller blocks within an entire event sequence with the same set of weights instead of using a larger weight tensor for the complete event sequence. Specifically, for one-dimensional data-like sequences, as would be the case for an event sequence E that may have computer instructions that may be part of malware, CNNs traverse over smaller chunks or subsequences of the input sequence to perform convolutions over each subsequence while updating a smaller weight kernel. The updated weight kernel is used to perform the CNN operation on subsequent subsequences. Thus, for example, the weight kernel used for performing the CNN operation on subsequence $C_1$ is same as the weight kernel used to perform the CNN operation on the subsequences $C_2$, $C_3$, etc., and is learned from each of these subsequence during training In one implementation, the CNN operation on the subsequences $C_1$ also includes local max-pooling operations as part of $710_i$, (not shown).

Figure 8:
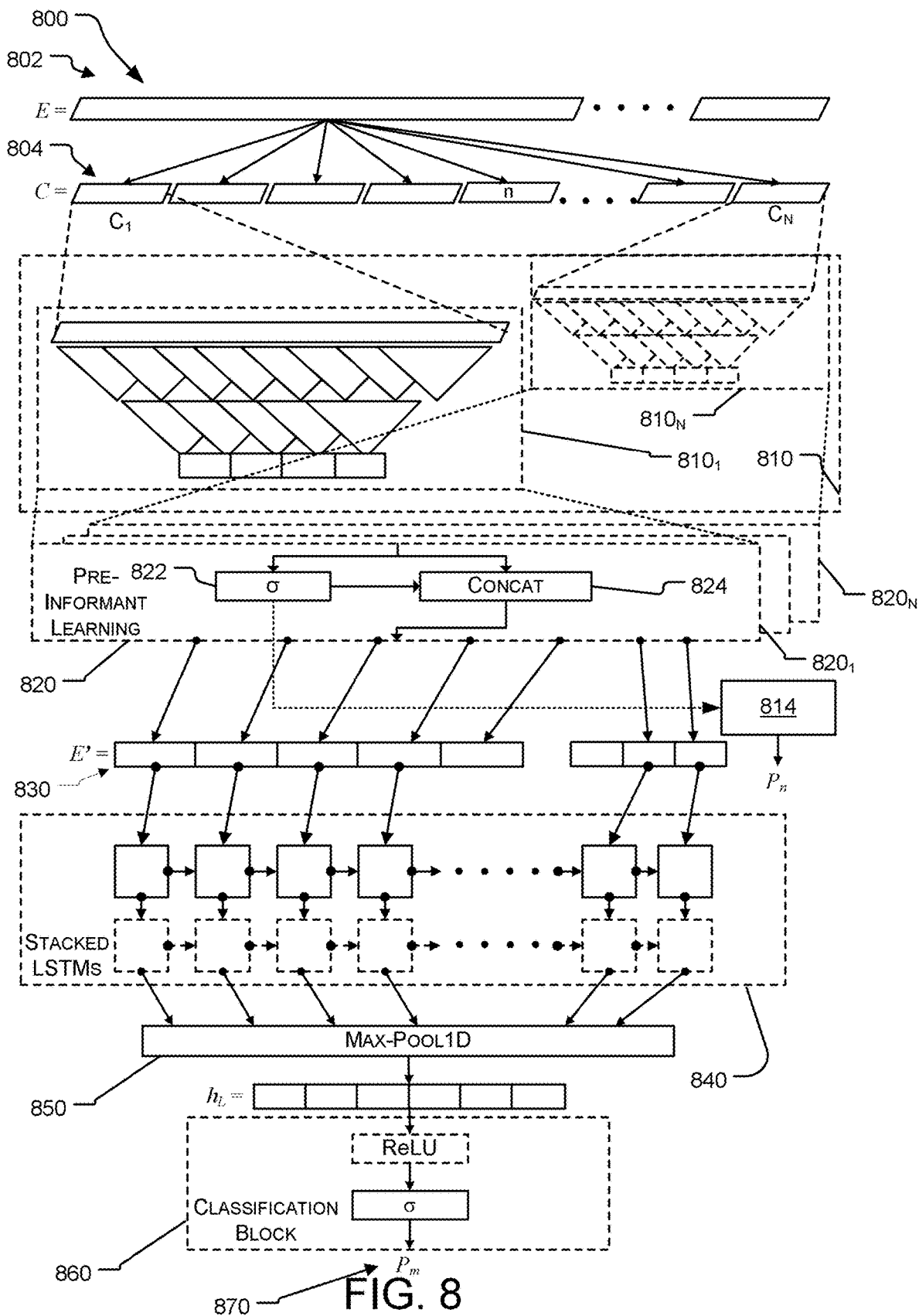
FIG. 8 illustrates an example implementation of the malware sequence detection system further using pre-informant learning.

FIG. 8 illustrates an implementation 800 of the malware sequence detection system further using pre-informant learning. As shown in FIG. 8, an event sequence 802 is converted into a number of chunks or subsequences 804. The subsequences 804 are input to a convolutional layer 810 that performs a number of CNN operations on each of the subsequences 804. Thus, the convolutional layer 810 performs sequential subsequence learning on the subsequences 804. The output of the processing of subsequence $C_k$ by the convolutional layer 810$_k$ is $h_{Ck}$. The output of a convolutional layer 810, $h_{Ck}$, is input to a pre-informant learning (PIL) layer 820.

The PIL layer 820 includes a sigmoid operation 822 and a concatenation operation 824. Specifically, the sigmoid operation 822 generates a sigmoid value $\mu_k$ to an output vector $h_{Cn}$ from the convolutional layer 810 and the concatenation operation 824 concatenates the sigmoid value $\mu_k$ to the $h_{Ck}$ as follows:

$$\mu_k = \sigma(W_c h_{Ck})$$

$$h_{Ck} = \text{Concatenate}([h_{Ck}, \mu_k])$$

Thus, for example, if the output of the convolutional layer 810 is a vector with 200 elements, the output of the PIL layer 820 has 201 elements. Furthermore, for each CNN layer 810$_n$, for subsequence $C_n$, the PIL layer 820 performs a PIL operation. Thus, the output of the CNN layer 810$_i$ for subsequence $C_1$ is processed by PIL layer 820 as illustrated by 820$_i$, the output of the CNN layer 810$_N$ for subsequence $C_n$ is processed by PIL layer 820 as illustrated by 820$_N$, etc.

Calculating and adding the sigmoid value $\mu_k$ to an output vector $h_{Ck}$ from the convolutions 810 provides additional information that allows determining when to stop processing the event sequence E(t). Thus, based on a comparison of the value of the sigmoid $\mu_k$ to a threshold, the malware sequence detection system may determine that it is not necessary to process any additional chunks or subsequences 804 of the event sequence E. Thus, for example, if a value of a sigmoid $\mu_k$ for an output of a CNN layer 810$_k$ is above a threshold, no more subsequences are created and processed. In other implementations, a comparison of the most recent values of sigmoid $\mu_k$, such as the output of a moving average filter, can be used to make the halting decision. Furthermore, if the value of a sigmoid $\mu_k$ for an output of a CNN layer 810$_k$ is above a threshold, the malware sequence detection system may also stop further processing of output vector E' 830 through the stacked LSTM model and any of the subsequent layers 840, 850, etc.

In one implementation, the output of the sigmoid operation 822 may be evaluated at an operation 814 to generate a probability $P_n$ of a partial event sequence E up to an event n indicating presence of malware. If the probability $P_n$ indicates the presence of malware, further processing may be stopped. Otherwise, the output vector E' 830 from the PIL layers 820 is input to a recurrent layer 840, which generates an output that is input to a max-pooling layer 850. A classification block 860 generates a probability $P_m$ 870 of the event sequence E being malware. In another implementation, the probability $P_m$ 870 can be used to terminate the execution of a file or process if it is above a threshold. The value of the probability $P_m$ 870 may also be evaluated to indicate presence of malware and to determine if further processing should be stopped.

Figure 9:
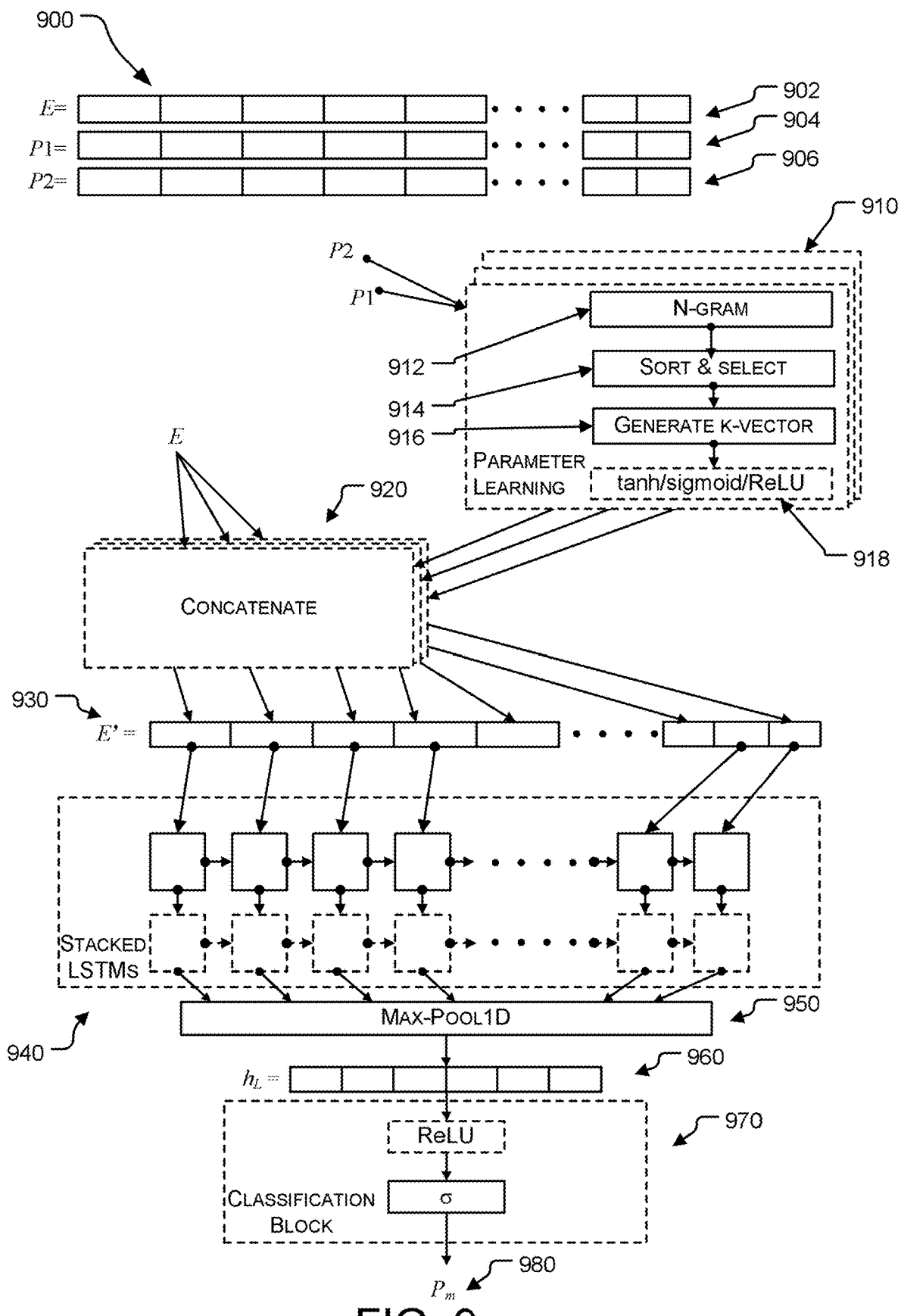
FIG. 9 illustrates an example implementation of the malware sequence detection system further using parameter learning.

FIG. 9 illustrates an implementation 900 of the malware sequence detection system further using parameter learning. While one or more of the models discussed above uses event sequences E without considering any of the parameters or metadata related to these events, the implementation 900 of the malware sequence detection system takes into consideration the parameters associated with these events as well. An example of the parameters associated with events is illustrated below in Table 1. Note that while in Table 1, each event is associated with only one parameter, but more parameters may be associated with each event.

TABLE 1

| Event | Parameter |
| --- | --- |
| loadlibrarya | shlwapi.dll |
| getprocaddress | waveoutprepareheader |
| getprocaddress | midistreamclose |
| getmodulehandle | shlwapi.dll |
| createfilea | c:\\ |
| getprocaddress | midistreamout |
| getprocaddress | waveoutgetnumdevs |
| getmodulehandle | kernel32.dll |

In one implementation, the number of parameters and/or the selection of parameters depends on the working environment. Thus, for example, if the malware sequence detection system is used at the operating system level, there may be no limit on the number of parameters for each event. On the other hand, if the malware sequence detection system is used in an emulator environment, a predetermined number of parameters may be associated with each event.

In FIG. 9, the event sequence 902 is illustrated with two parameter vectors P1 904 and P2 906. The parameter vectors 904, 906 are processed by a parameter learning model 910. Specifically, an n-gram operation 912 computes the n-gram of the parameter value. For example, the n-gram operation 912 may compute a tri-gram of the parameter value. This allows the parameters to be analyzed using a relatively small number of grams to be analyzed. For example, for a parameter value of "kernel132.dll," the n-gram operation 912 may generate output n-grams of "ker," "ern," "me," . . . "2.d," ".dl," and "dll". Subsequently, the corpus of n-grams output by the n-gram operation 912 are sorted at 914 in order of their occurrences or their importance, as determined by feature selection, and the frequency distribution of the n-grams is generated to determine which n-grams appear with high frequency. A predetermined number of n-grams having high frequencies are selected. For example, the top one-hundred grams in terms of frequency maybe selected.

An operation 916 creates a k-vector for each event in the event sequence with each cell in the k-vector having a value 1 if the parameter from the list of top n-grams is present for the given event and 0 otherwise. Thus, for example, if the operation 914 were to select top 5 tri-grams with the values of "dll," "c:/," "exe," "ker," and "get," in that order, and if an event has the parameter with the tri-gram "ker" and none of the others, the k-vector for that event may be given as [0, 0, 0, 1, 0], Similarly, another event that includes parameters with tri-grams "dll" and "get" and none of the others, the k-vector for that event may be given as [1, 0, 0, 0, 1], In an alternative implementation, a sparse vector may be used to represent the k-vector, which is the set of indices corresponding to the n-grams that are present in the parameter. No indices are used for the n-grams which are not present in the parameter. In another implementation, the sparse vector includes the indices and the counts of the n-gram features that are present in the parameter instead of only containing the indices indicating the presence of the n-gram features. Thus, for example, instead of just providing the index of each n-gram feature which is present in the parameter, with an implied value of "1", both the index and the count of each n-gram feature that is present in the parameter is included in the sparse vector. Alternatively, other representations of sparse vectors may also be used.

Subsequently, a tanh operation 918 generates values in the range of −1 to 1 for each of the k-vector determined at operation 916. In alternative implementations, other functions, such as a sigmoid function, a rectified linear unit (ReLU) function, etc., may be used instead of the tanh operation 918. Furthermore, an embedding layer (not shown) may convert each event of the event sequence 902 into an event vector. The value output by the tanh operation 918 is concatenated at an operation 920 to the event vector output by the embedding layer. Thus, if the event vector output by the embedding layer had 200 elements with the addition of the parameters, it becomes a vector with 202 elements, if two parameters are processed. In one implementation, where the events of the event sequence 902 may have more than two parameters, the parameter learning model 910 may select two of the most important parameters in the parameter vectors 904, 906.

The concatenated event vector E' 930 is input to the stacked LSTM layer 940, the output of which is input to a max-pooled layer 950. The output 960 of the max-pooled layer 950 is input to a classification block 970, which generates a probability $P_m$ 980 of the event sequence E(t) 902 being malware. While the parameter learning model 910 is illustrated in FIG. 9 as being used with a max-pooled layer 950, in alternative implementations, the parameter learning model 910 may also be used with other models disclosed herein.

Figure 10:
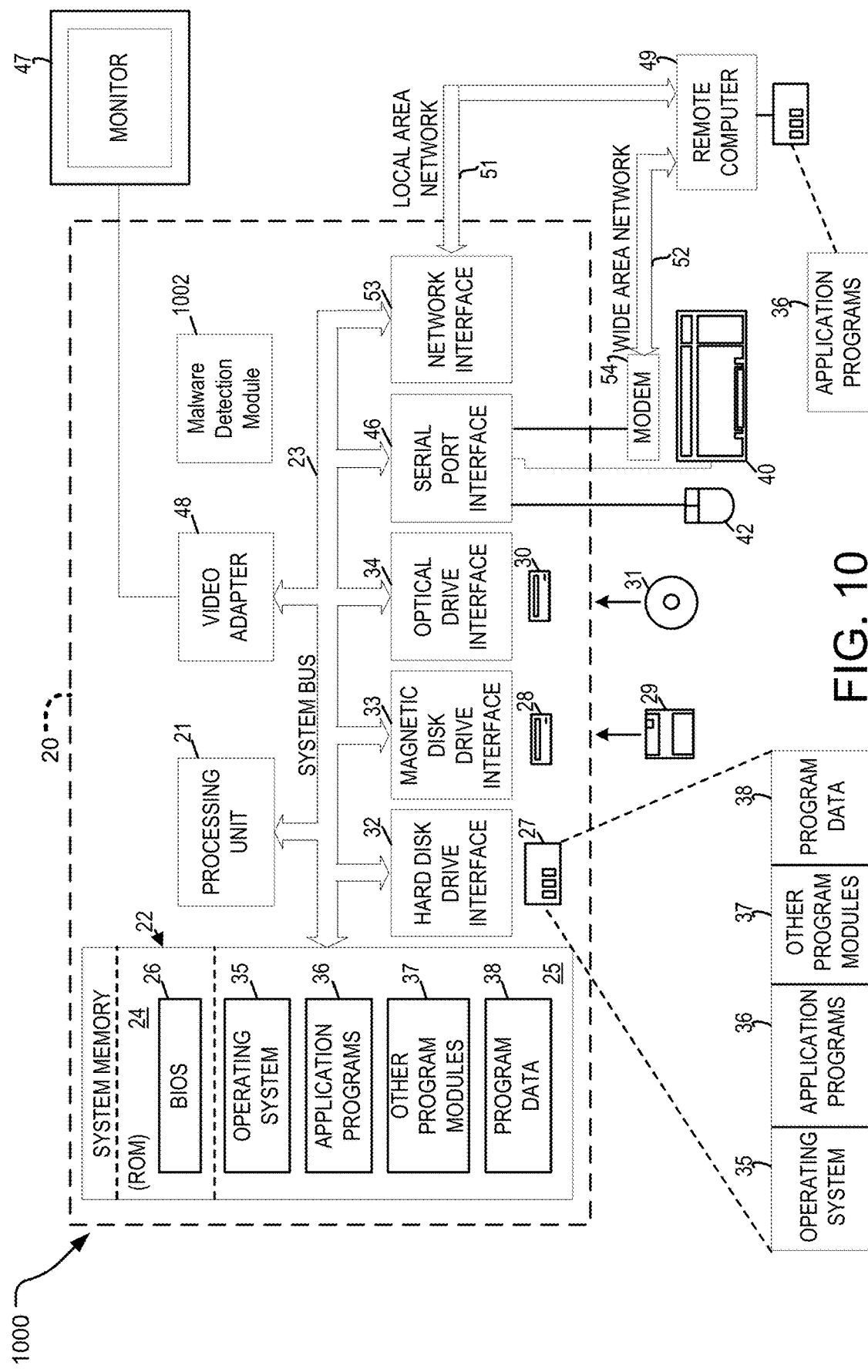
FIG. 10 illustrates an example system that may be useful in implementing the described technology.

FIG. 10 illustrates an example system 1000 that may be useful in implementing the described technology for providing malware sequence detection. The example hardware and operating environment of FIG. 10 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 10, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing personalized malware sequence detection may be stored in memory 22 and/or storage devices 29 or 31 and processed by the processing unit 21. Rules for providing personalized malware sequence detection may be stored in memory 22 and/or storage devices 29 or 31 as persistent datastores. For example, a malware sequence detection module 1002 may be implemented on the computer 20 (alternatively, the malware sequence detection module 1002 may be implemented on a server or in a cloud environment). The malware sequence detection module 1002 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for providing personalized malware sequence detection may include a variety of tangible computer-readable storage media and intangible computer-readable communication signals. Tangible computer-readable storage can be embodied by any available media that can be accessed by the malware sequence detection system 210 (as disclosed in FIG. 2) and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the malware sequence detection system 210 (as disclosed in FIG. 2). In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The malware sequence detection system disclosed herein provides a solution to a technological problem necessitated by the presence of malware in various computing systems. Specifically, the malware sequence detection system disclosed herein provides an unconventional technical solution to this technological problem including receiving a sequence of a plurality of events, and detecting presence of a sequence of malware commands within the sequence of a plurality of events by dividing the sequence of plurality of events into a plurality of subsequences, performing sequential subsequence learning on one or more of the plurality of subsequences, and generating a probability of one or more of the plurality of subsequences being a malware based on the output of the sequential subsequence.

A physical article of manufacture disclosed herein includes one or more tangible computer-readable storage media, encoding computer-executable instructions for executing on a computer system a computer process to provide malware sequence detection, the computer process including receiving a sequence of a plurality of events and detecting presence of a sequence of malware commands within the sequence of a plurality of events by dividing the sequence of the plurality of events into a plurality of subsequences, performing sequential subsequence learning on one or more of the plurality of subsequences, and generating a probability Pn of one or more of the plurality of subsequences being a malware based on the output of the sequential subsequence learning. In one implementation, performing sequential subsequence learning on the one or more of the plurality of subsequences comprises performing convolutional learning on the one or more of the plurality of subsequences. In an alternative implementation, performing sequential subsequence learning on the one or more of the plurality of subsequences comprises performing recurrent learning on the one or more of the plurality of subsequences.

In an implementation of the physical article of manufacture the computer process further includes a pre-informant learning (PIL) process, the PIL process including performing a sigmoid operation on output of the sequential subsequence learning on one or more of the plurality of subsequences, concatenating the output of the sigmoid operation of each of the one or more of the plurality of subsequences to the one or more of the plurality of subsequences, and recombining the concatenated one or more of the plurality of subsequences to form an output vector (E'). In one implementation, the PIL process further comprises comparing the output of the sigmoid operation to a threshold and in response to determining that the output of the sigmoid operation to be above the threshold generating a notification to a receiver and terminating further processing of subsequent subsequences.

In an implementation of the physical article of manufacture the computer process further includes processing the output vector (E') using a stacked LSTM layer and a max-pooling layer, generating a probability $P_m$ of the sequence of a plurality of events being a malware, and determining termination of execution of a file or process based on the value of the probability $P_m$. In another implementation, the computer process further includes receiving one or more parameters associated with each of the plurality of events, generating a plurality of parameter vectors using the one or more parameters associated with each of the plurality of events, and performing parameter learning operations on the plurality of parameter vectors. In another implementation, parameter learning operations further includes generating a plurality of n-grams from one or more parameters, sorting the plurality of n-grams and selecting a first number of the plurality of n-grams based on their frequency, generating k-vectors based on the selected first number of n-grams, wherein each k-vectors identify presence and absence of n-grams associated with an event, and performing a tanh operation on the k-vectors to generate a plurality of output values based on the k-vectors. In another implementation, the computer process further includes concatenating one or more of the plurality of the output values generated by the tanh operation to one or more of the sequence of the plurality of events.

In another implementation, the computer process further includes passing the recombined sequence through a stacked long-short term memory (LSTM) model, processing the output of the LSTM model through a max-pooling operation to generate a max-pooled sequence of events, and classifying the max-pooled sequence of events to generate a probability value of presence of malware within the sequence of a plurality of events.

A method disclosed herein performed at least in part on at least one processor includes detecting presence of a sequence of malware commands within a sequence of a plurality of events by dividing the sequence of plurality of events into a plurality of subsequences, performing sequential subsequence learning on one or more of the plurality of subsequences, and generating a probability Pn of one or more of the plurality of subsequences being a malware based on the output of the sequential subsequence learning. In one implementation, performing sequential subsequence learning on the one or more of the plurality of subsequences comprises at least one of performing convolutional learning and performing recurrent learning on the one or more of the plurality of subsequences. In another implementation, the method further includes a pre-informant learning (PIL) process, the PIL process including performing a sigmoid operation on output of the sequential subsequence learning on one or more of the plurality of subsequences, and concatenating the output of the sigmoid operation of each of the one or more of the plurality of subsequences to the one or more of the plurality of subsequences, recombining the concatenated one or more of the plurality of subsequences to form an output vector (E').

In another implementation, the PIL process further includes comparing the output of the sigmoid operation to a threshold and in response to determining that the output of the sigmoid operation to be above the threshold generating a notification to a receiver and terminating further processing of subsequent subsequences. In another implementation, the method further includes receiving one or more parameters associated with each of the plurality of events, generating a plurality of parameter vectors using the one or more parameters associated with each of the plurality of events, and performing parameter learning operations on the plurality of parameter vectors. In yet another implementation, the parameter learning operations further includes generating an n-gram from one or more parameters, sorting the n-grams and selecting a first number of n-grams based on their frequency, generating k-vectors based on the selected first number of n-grams, wherein each k-vector identifies presence or absence of n-grams associated with an event, and performing a tanh operation on the k-vectors to generate an output value based on the k-vectors. In one implementation, the method further includes concatenating the output value generated by the tanh operation to the sequence of the plurality of events.

In one implementation, the method further includes passing the recombined sequence through a stacked long-short term memory (LSTM) model, processing the output of the LSTM model through a max-pooling operation to generate a max-pooled sequence of events, and classifying the max-pooled sequence of events to generate a probability value of presence of malware within the sequence of a plurality of events.

A system disclosed herein includes a memory, one or more processors, and a malware sequence detection system stored in the memory and executable by the one or more processor units, the malware sequence detection system encoding computer-executable instructions on the memory for executing on the one or more processor units a computer process to provide malware sequence detection, the computer process including dividing a sequence of plurality of events into a plurality of subsequences, performing sequential subsequence learning on one or more of the plurality of subsequences, generating a probability $P_m$ of the sequence of a plurality of events being a malware, and determining termination of execution of a file or process based on the value of the probability $P_m$. In one implementation of the system, the computer process further includes determining termination of further processing of the sequence of plurality of events based on the value of the probability $P_m$.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible computer-readable storage device, encoding computer-executable instructions for executing on a computer system a computer process to provide malware sequence detection, the computer process comprising:
   receiving a sequence of a plurality of events;
   dividing the sequence of the plurality of events into a plurality of subsequences,
   performing sequential subsequence learning on at least one of the plurality of subsequences;
   generating a sigmoid value based on the output of the sequential subsequence learning; and
   based on a comparison of the sigmoid value to a threshold, generating a probability Pn of the at least one of the plurality of subsequences being a malware.

2. The physical article of manufacture of claim 1, wherein performing sequential subsequence learning on the at least one of the plurality of subsequences comprises performing convolutional learning on the at least one of the plurality of subsequences.

3. The physical article of manufacture of claim 2, wherein performing sequential subsequence learning on the at least one of the plurality of subsequences comprises performing recurrent learning on the at least one of the plurality of subsequences.

4. The physical article of manufacture of claim 1, wherein the computer process further comprising a pre-informant learning (PIL) process, the PIL process including:
    performing a sigmoid operation on output of the sequential subsequence learning on the at least one of the plurality of subsequences;
    concatenating the output of the sigmoid operation of each of the at least one of the plurality of subsequences to the at least one of the plurality of subsequences; and
    recombining the concatenated at least one of the plurality of subsequences to form an output vector (E').

5. The physical article of manufacture of claim 4, wherein the PIL process further comprising:
    in response to determining that the output of the sigmoid operation to be above the threshold generating a notification to a receiver and terminating further processing of subsequent subsequences.

6. The physical article of manufacture of claim 4, wherein the computer process further comprising:
    processing the output vector (E') using a stacked LSTM layer and a max-pooling layer;
    generating a probability $P_m$ of the sequence of a plurality of events being a malware; and
    determining termination of execution of a file or process based on the value of the probability $P_m$.

7. The physical article of manufacture of claim 1, wherein the computer process further comprising:
    receiving at least one parameters associated with each of the plurality of events;
    generating a plurality of parameter vectors using the at least one parameters associated with each of the plurality of events; and
    performing parameter learning operations on the plurality of parameter vectors.

8. The physical article of manufacture of claim 7, wherein the parameter learning operations further comprising:
    generating a plurality of n-grams from at least one parameters;
    sorting the plurality of n-grams and selecting a first number of the plurality of n-grams based on their frequency;
    generating k-vectors based on the selected first number of n-grams, wherein each k-vectors identify presence and absence of n-grams associated with an event; and
    performing a tanh operation on the k-vectors to generate a plurality of output values based on the k-vectors.

9. The physical article of manufacture of claim 8, wherein the computer process further comprising:
    concatenating at least one of the plurality of the output values generated by the tanh operation to at least one of the sequence of the plurality of events.

10. The physical article of manufacture of claim 1, wherein the computer process further comprising:
    passing the recombined sequence through a stacked long-short term memory (LSTM) model;
    processing the output of the LSTM model through a max-pooling operation to generate a max-pooled sequence of events; and
    classifying the max-pooled sequence of events to generate a probability value of presence of malware within the sequence of a plurality of events.

11. In a computing environment, a method performed at least in part on at least one processor, the method comprising:
    dividing a sequence of plurality of events into a plurality of subsequences,
    performing sequential subsequence learning on at least one of the plurality of subsequences,
    generating a sigmoid value based on the output of the sequential subsequence learning, and
    based on a comparison of the sigmoid value to a threshold, generating a probability Pn of the at least one of the plurality of subsequences being a malware.

12. The method of claim 11, wherein performing sequential subsequence learning on the at least one of the plurality of subsequences comprises at least one of performing convolutional learning and performing recurrent learning on the at least one of the plurality of subsequences.

13. The method of claim 11, further comprising a pre-informant learning (PIL) process, the PIL process including:
    performing a sigmoid operation on output of the sequential subsequence learning on the at least one of the plurality of subsequences; and
    concatenating the output of the sigmoid operation of each of the at least one of the plurality of subsequences to the at least one of the plurality of subsequences;
    recombining the concatenated at least one of the plurality of subsequences to form an output vector (E').

14. The method of claim 13, wherein the PIL process further comprising:
    in response to determining that the output of the sigmoid operation to be above the threshold generating a notification to a receiver and terminating further processing of subsequent subsequences.

15. The method of claim 11, further comprising:
    receiving at least one parameters associated with each of the plurality of events;
    generating a plurality of parameter vectors using the at least one parameters associated with each of the plurality of events; and
    performing parameter learning operations on the plurality of parameter vectors.

16. The method of claim 15, wherein the parameter learning operations further comprising:
    generating an n-gram from the at least one parameters;
    sorting the n-grams and selecting a first number of n-grams based on their frequency;
    generating k-vectors based on the selected first number of n-grams, wherein each k-vector identifies presence or absence of n-grams associated with an event; and
    performing a tanh operation on the k-vectors to generate an output value based on the k-vectors.

17. The method of claim 15, further comprising concatenating the output value generated by the tanh operation to the sequence of the plurality of events.

18. The method of claim 15, further comprising:
    passing the recombined sequence through a stacked long-short term memory (LSTM) model;
    processing the output of the LSTM model through a max-pooling operation to generate a max-pooled sequence of events; and
    classifying the max-pooled sequence of events to generate a probability value of presence of malware within the sequence of a plurality of events.

19. In a computing environment, a system comprising:
memory;
at least one processor units;
a malware sequence detection system stored in the memory and executable by the at least one processor units, the malware sequence detection system encoding computer-executable instructions on the memory for executing on the at least one processor units a computer process to provide malware sequence detection, the computer process comprising:
  dividing a sequence of plurality of events into a plurality of subsequences;
  performing sequential subsequence learning on at least one of the plurality of subsequences;
  generating a sigmoid value based on the output of the sequential subsequence learning;
  based on a comparison of the sigmoid value to a threshold, generating a probability $P_m$ of the sequence of a plurality of events being a malware; and
  determining termination of execution of a file or process based on value of the probability $P_m$.

20. The system of claim 19, wherein the computer process further comprising determining termination of further processing of the sequence of plurality of events based on the value of the probability $P_m$.

* * * * *